Dec. 13, 1966  C. N. WALTER  3,291,096
EXPANDABLE SIGNAL
Filed April 10, 1964

CLETUS NEAL WALTER
INVENTOR

Huebner & Worrel
ATTORNEYS

United States Patent Office 3,291,096
Patented Dec. 13, 1966

3,291,096
EXPANDABLE SIGNAL
Cletus Neal Walter, San Diego, Calif., assignor of thirty-seven and one-half percent to the firm of McCormick, Barstow, Sheppard, Coyle & Best, Fresno, Calif.
Filed Apr. 10, 1964, Ser. No. 358,880
10 Claims. (Cl. 116—63)

The present invention relates to an expandable signal for deposit in predetermined zones or areas to be marked and more particularly to such a signal which is normally disposed in a compact, non-signaling condition and is self rupturing upon impact automatically to assume an expanded signaling position.

Various types of signals heretofore have been employed for warning of dangerous situations, such as excavations in traveled areas, automobile accidents, and other hazardous conditions on the highways and the like. Such signals have included wooden barricades, flares, battery powered flashlights, and inflatable and spring actuated stanchions. Such devices usually consist of non-collapsible structures which create handling, transporting and storage problems. They cannot be carried in a vehicle in any substantial number for ready use in emergency situations. Furthermore, they all require manual placement which necessitates stopping the transporting vehicle with consequent exposure of the depositor of such warning devices to traffic. Such signaling devices frequently create an additional hazard to approaching traffic. When struck by a vehicle, such signals frequently cause damage to the tires or other portions of the vehicle and usually are themselves damaged so as to be rendered ineffective for their intended purpose.

Therefore, it is an object of the present invention to provide an improved signal for deposit in zones and areas to be marked.

Another object is to provide such a signal which is adapted for use with a mechanical ejecting mechanism or which may be manually deposited.

Another object is to provide a signal which is capable of being ejected from a moving vehicle and upon impact with the ground or other obstruction to assume a signaling condition.

Another object is to provide a signal which is easily stored in a compact condition and is self rupturing to a signaling condition upon impact.

Another object is to provide a signal which is automatically expandable to an upright signaling position upon projection into an area to be marked.

Another object is to provide a signal which is durable and resists damage by tires of automobiles driven thereover.

Another object is to provide a signal which can be easily handled, transported and stored in a minimum of space.

Another object is to provide a signal which is formed of a visually attractive, non-combustible material, which is capable of being disposed in a signaling position for indefinite periods, and which is substantially indestructible.

Other objects and advantages of the present invention will subsequently become more fully apparent upon reference to the following description in the specification.

Figure 1:
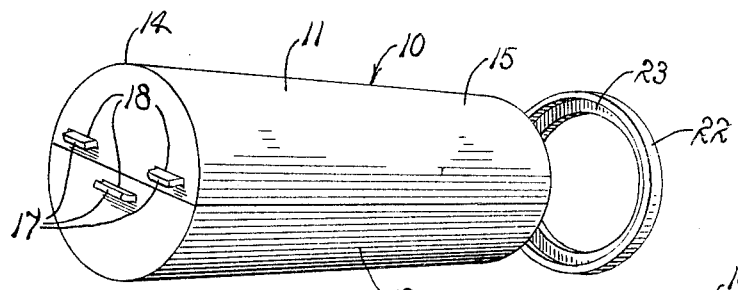
FIG. 1 is a perspective of a signal embodying the principles of the present invention having a constraining ring holding the signal in a closed, non-signaling position.
Figure 3:
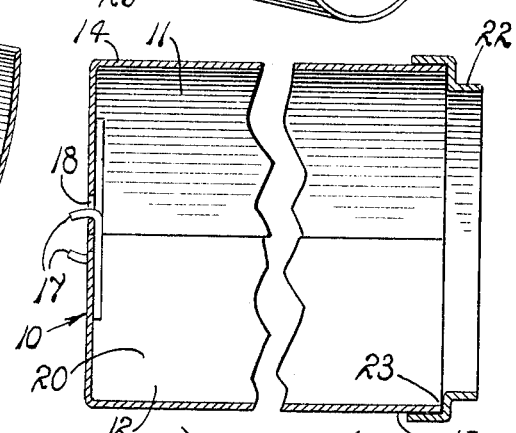
FIG. 3 is a fragmentary foreshortened central section through the connecting ends of the housing of the signal shown in the closed position of FIG. 1.

Referring more particularly to the drawing, the signal embodying the principles of the present invention provides a longitudinally split, substantially cylindrical housing or shell 10 having separable semi-cylindrical portions 11 and 12. The housing is preferably fabricated of a lightweight, substantially rigid material such as a suitable thermoplastic material or lightweight metal. The housing includes predetermined forward and rearward ends 14 and 15, respectively. Each of the semi-cyclindrical portions of the housing is provided at its forward end with hook members 17 which are receivable within complementarily formed openings 18 provided in their opposite or companion semi-cylindrical portions. The hooks and openings cooperate to provide a readily detachable pivotal conection between the semi-cylindrical portions of the housing. When pivotally interconnected and moved to the closed position of FIGS. 1 and 3, the portions form a substantially cylindrical compartment 20 within the housing. The housing is held in such closed position by a constraining ring 22 having a counterbore 23 therein of a diameter slidably to receive the rearward end of the housing in its closed position.

Figure 2:
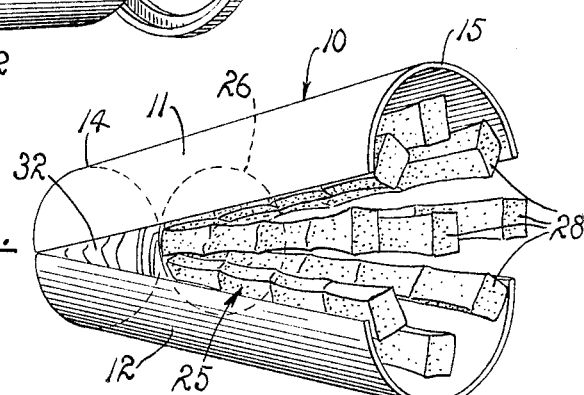
FIG. 2 is a perspective showing the signal with its constraining ring removed and in a partially open position with a signal element visible therein.
Figure 4:
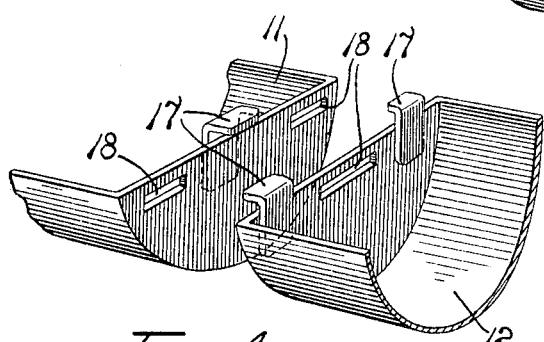
FIG. 4 is a perspective of connecting ends of the housing shown in a separated condition.
Figure 5:
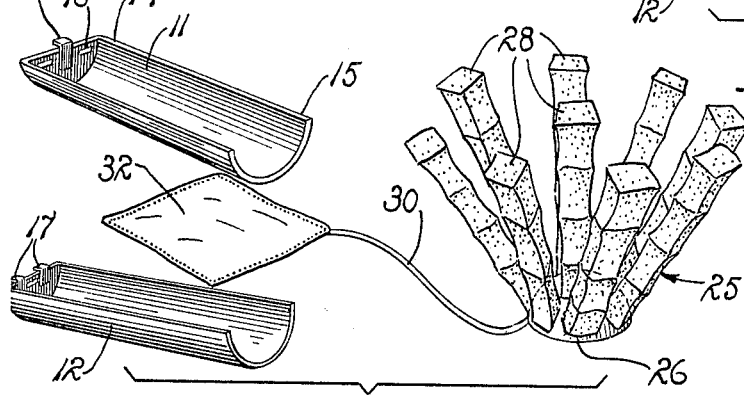
FIG. 5 is a perspective view of the signal and its signal element.

As best shown in FIGS. 2 and 5, a signal element 25 is adapted to be stored within the compartment 20 of the housing 10. The signal element includes a base portion 26 from which a plurality of elongated fingers 28 are divergently extended. The fingers are preferably formed of a resilient elastomeric material, such as sponge rubber or the like, which is preferably provided with a luminescent coating of either phosphorescent, fluorescent, or reflective material so as to attract attention. The base is connected by a flexible cord 30 to an anchor 32 formed by a flexible container filled with a weighting material such as lead shot or the like.

When the signal element is disposed in the compartment 20 of the housing 10, the fingers 28 are tightly wedged together under compression and provide a reaction force tending to separate the semi-cylindrical portions 11 and 12 of the housing. Such force is resisted, however, by the constraining ring 22 until an impact or other force is imposed on the housing, as by the forward end 14 thereof striking the surface of a highway or the like, to cause the ring to be jettisoned from the housing.

Operation

The operation of the described embodiment of the subject invention is believed to be clearly apparent and is briefly summarized at this point. In order to prepare the signal for use, the hook members 17 are extended through their corresponding openings 18 and the anchor 32, the flexible cord 30 and the base portion 26 are deposited in the compartment 20 of the housing 10 adjacent to the forward end 14 thereof. The fingers 18 are then compressed and folded into the remaining portion of the compartment and the semi-cylindrical portions 11 and 12 of the housing compressed thereabout. The constraining ring 22 is disposed in circumscribing position about the rearward end 15 of the housing to hold the semi-cylindrical portions in such assembled closed position.

The assembled signals may be stored in any convenient location in the driver's compartment of a vehicle for ready use in case of emergency. When such emergency occurs, the signals may be thrown or dropped by the driver from the moving vehicle so that the forward end 14 of the housing 10 will encounter the surface of the highway. With the anchor 32 concentrating most of the weight of the housing adjacent to its forward end, the force of gravity acting thereon causes the forward end to strike the highway with the shock forces generated by the impact directed toward the rearward end 15 thereof. Such shock forces are sufficient to cause automatic and instantaneous removal of the constraining ring even when the signal is dropped or thrown a short distance and no matter what portion of the device is first to impact against the target area.

Upon removal of the constraining ring 22, the semi-cylindrical portions 11 and 12 of the housing 10 immediately open. Such opening of the housing is caused by the resilient fingers 28 which are permitted to expand and, along with the shock forces encountered, completely separate the semi-cylindrical portions of the housing. As a result, the fingers 28 of the signal element 25 are liberated and the base 26 is rested against the surface of the highway by virtue of its low center of gravity. As a result, the fingers are automatically disposed in upwardly diverging relation in a desired signaling attitude with the cord 30 and anchor 32 constraining the signal element in its desired deposited position.

It is apparent that the signals may be released from the vehicle either individually or in groups or at any spaced intervals as may be desired. The driver can thereby lay down a string of such signals along the highway during movement of the vehicle toward or through a danger area so as to warn oncoming and following traffic.

In view of the foregoing, it is apparent that the structure of the present invention has provided an improved signal which is easily adapted for discharge from moving vehicles by either mechanical ejecting devices or by manual discharge by the driver or passenger of the vehicle. The signal is easily compressed to a compact, static form for storage and discharge and, upon impact, is automatically opened and constrained in a visually attractive signaling position.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A signal comprising a housing having separable portions of substantially rigid material releasably interconnected for movement between opened and closed positions, constraining means adapted to be mounted on the housing releasably to hold the housing in said closed position, a signal element adapted to be releasably disposed within the housing having a plurality of normally divergent resilient fingers tightly compressed within the housing when in said closed position and exerting a force sufficient automatically to motivate said separable portions of the housing to said open position completely to liberate said signal element and to display the fingers in divergent signaling relation upon an impact of a force against the housing sufficient to disengage said constraining means from the housing.

2. A signal comprising a housing having separable portions of substantially rigid material and providing predetermined forward and rearward ends, said forward end being releasably interconnected for pivotal movement of the separable portions of the housing between opened and closed positions; constraining means adapted to be mounted on said rearward end of the housing to hold said separable portions thereof in said closed position; a signal element of resiliently flexible material adapted to be releasably disposed within the housing and having a plurality of normally divergent fingers tightly compressed within the housing when in said closed position and exerting a force sufficient automatically to motivate said separable portions of the housing to said open position completely to liberate and to display the fingers in divergent signaling relation incident to an impact of a force upon the housing sufficient to disengage said constraining means from the housing.

3. A signal comprising a housing having separable portions of substantially rigid material releasably interconnected for movement between opened and closed positions, constraining means adapted to be mounted on the housing to hold the housing in said closed position, a signal element disposed within the housing having a base of a diameter freely receivable within the housing, and a plurality of normally divergent fingers of resiliently flexible material extended from the base, an elongated cord having an end connected to the base and an opposite end, and anchor means connected to said opposite end of the cord, said fingers being tightly compressible within the housing when in said closed position and exerting a force sufficient automatically to motivate said separable portions of the housing to said open position completely to liberate the signal element and to display the fingers in divergent signaling relation incident to an impact of a force upon the housing sufficient to disengage said constraining means from the housing with said anchor means maintaining the signal member in approximately predetermined deposited position.

4. A signal comprising a housing having separable portions of substantially rigid material and providing predetermined forward and rearward ends, said forward end being releasably interconnected for movement of the separable portions of the housing between opened and closed positions; a constraining ring adapted to be received about the rearward end of the housing to hold the separable portions thereof in said closed position; a signal element of resiliently flexible material disposed within the housing having a base of a diameter freely receivable within the housing and a plurality of normally divergent fingers extended from the base; an elongated cord having an end connected to the base and an opposite end; and an anchor of deformable weighted material connected to said opposite end of the cord, said fingers of the signal element being tightly compressed within the housing when in said closed position and exerting a force sufficient automatically to motivate said separable portions of the housing to said open position completely to liberate the signal element so as to display the fingers in divergent signaling relation upon an impact of a force upon said housing sufficient to disengage said constraining ring from the rearward end thereof, said anchor cord maintaining the signal in a predetermined deposited position.

5. An emergency highway signal comprising a substantially hemispherical base having a substantially flat resting surface, and elongated resiliently flexible and compressible finger-like elements integral with the base and substantially radially extended therefrom in divergent relation, said fingers being collapsible for compact storage when compressibly constrained and expansible into said radially extended positions when liberated from such constraint and the signal having a center of gravity located in such relation to the base that when dropped onto a flat surface such as a highway the base assumes a position rested on its flat surface with the fingers upwardly divergently extended therefrom.

6. In an emergency highway signal, the combination of a substantially hemispherical base having a substantially flat resting surface, a plurality of elongated resiliently flexible and compressible finger-like elements integral with the base and substantially radially extended therefrom, a flexible and deformable container, a mass of discrete weight particles confined in the container and therewith forming a deformable anchor, and a flexible member tethering the base to the anchor.

7. In an emergency highway signal, the combination of a substantially hemispherical base having a substantially flat resting surface, a plurality of elongated resiliently flexible and compressible finger-like elements integral with the base and substantially radially extended therefrom, a deformable container, a mass of discrete weight particles confined in the container and therewith forming a deformable anchor, a flexible member tethering the base to the anchor, and a housing releasably containing the base, fingers, anchor and flexible member having releasably interconnected portions adapted to disengage upon impact and to release its contents.

8. An emergency highway signal adapted for discharge onto the highway from a moving vehicle comprising a visual attraction member compressible for compact storage and expansible upon release for visual attraction, a freely deformable container, a mass of discrete weight particles confined in the container and only partially filling the same and therewith forming a deformable anchor, and a flexible tether interconnecting the attraction member to the deformable anchor, said visual attraction member, container, particles and flexible tether constituting a freely flexible and deformable entity over which automotive vehicles may be driven without harm.

9. In an emergency highway signal adapted to be discharged onto a highway while under momentum sufficient to carry it along the highway from a point of initial impact, the combination of a substantial hemispherical base having a substantially flat resting surface, a plurality of elongated resiliently flexible compressible finger-like elements integral with the base and substantially radially extended therefrom, a deformable container, a mass of discrete weight particles confined in the container and therewith forming a deformable anchor, a flexible member tethering the base at a position adjacent to its resting surface to the anchor, and a housing releasably containing the base, fingers, anchor and flexible member having releasably interconnected portions adapted to disengage upon impact and to release its contents whereby the anchor acts as a drag on the base during movement under momentum following impact in cooperation with the resilient fingers to turn the base onto its resting surface with the fingers upwardly extended for visual attraction.

10. An emergency highway signal adapted for discharge onto the highway from a rapidly moving vehicle, and to retain a signaling position in relatively close proximity to where it contacts the ground comprising a signal element having a base and visual attraction means integral with the base and extended therefrom, said means being substantially entirely of flexible compressible material, a freely deformable flexible container, a mass of discrete flowable weight particles confined in the container and only partially filling the same and therewith forming a deformable anchor, and a flexible tether interconnecting the container and the base of the signal element in spaced relation accommodating relative movement therebetween within a predetermined limit defined by the length of said tether.

References Cited by the Examiner

UNITED STATES PATENTS

| | | | |
|---|---|---|---|
| 1,903,082 | 3/1933 | Adam | 46—146 |
| 2,418,549 | 4/1947 | De Rugeris | 9—9 |
| 2,446,540 | 8/1948 | Leach | 46—146 |
| 2,619,303 | 11/1952 | Martin | 116—124.9 |
| 2,639,106 | 5/1953 | Sesera | 340—366 |
| 3,108,705 | 10/1963 | Barber | 220—4 |
| 3,132,624 | 5/1964 | Shoemaker | 116—63 |

FOREIGN PATENTS

| | | |
|---|---|---|
| 517,241 | 2/1953 | Belgium. |
| 1,263,761 | 5/1961 | France. |
| 603,348 | 3/1960 | Italy. |
| 82,708 | 10/1919 | Switzerland. |

OTHER REFERENCES

Lind: German printed application 1,120,358, 12/1961.

LOUIS J. CAPOZI, *Primary Examiner.*